United States Patent [19]

Howell

[11] 4,272,797
[45] Jun. 9, 1981

[54] FAST RECOVERY PEAK DETECTOR

[75] Inventor: Edward K. Howell, Simsbury, Conn.

[73] Assignee: General Electric Company, New York, N.Y.

[21] Appl. No.: 62,460

[22] Filed: Jul. 31, 1979

[51] Int. Cl.³ .............................................. H02H 3/08
[52] U.S. Cl. ................................................... 361/93
[58] Field of Search ...................... 361/42, 93, 94, 96, 361/98, 87, 97

[56] References Cited

U.S. PATENT DOCUMENTS

| 4,104,691 | 8/1978 | Shimp et al. | 361/98 X |
| 4,115,829 | 9/1978 | Howell | 361/42 |
| 4,161,761 | 7/1979 | Moran | 361/98 X |

*Primary Examiner*—Harry E. Moose, Jr.
*Attorney, Agent, or Firm*—Robert A. Cahill; Walter C. Bernkopf; Philip L. Schlamp

[57] ABSTRACT

In a circuit breaker static trip unit, a peak detector generates a DC current signal of a magnitude proportional to the rectified peak signal voltage developed across a current transformer burden resistor. The peak detector utilizes a differential amplifier operating in conjunction with a peak signal voltage detecting circuit connected therewith as a negative DC feedback network. A recovery circuit detects the relative amplitudes of consecutive signal voltage peaks pursuant to rapidly adjusting the peak signal voltage detecting circuit to signal voltage peaks of decreasing amplitudes.

10 Claims, 2 Drawing Figures

FAST RECOVERY PEAK DETECTOR

BACKGROUND OF THE INVENTION

Electronic solid state, i.e., static trip units are being implemented in increasing numbers in industrial circuit breakers in place of the traditional thermal and magnetic trip units to initiate circuit interruption automatically in response to an overcurrent condition. Increasing popularity of static trip circuit breakers is largely due to their inherent versatility. That is, a circuit breaker static trip unit is readily susceptible to convenient trip setting adjustment such that a highly repeatable trip-time curve can be rather precisely tailored to the load so as to provide full overcurrent protection thereof ranging from light overload to heavy short circuit proportions. Another attractive aspect of static trip units is the fact that they can be readily and economically supplemented to afford ground fault protection, as well as overcurrent protection, to load circuits.

Typically, static trip units are self-powered, in that, rather than being powered from a separate electrical source, they receive operating power from the same source feeding the protective load circuit. More specifically, current transformers, one coupled with each phase or line conductor of the protected load circuit, are utilized to develop secondary currents proportional to the load circuit phase currents. These secondary currents are full-wave rectified pursuant to providing an output current of a magnitude proportional to the highest level of phase current experienced by any one of the three current transformers. From this full-wave rectified output current, the static trip unit extracts sufficient energy to electrically power itself while preserving the informational or signal content thereof regarding the highest phase current magnitude.

The signal content of this output current is manifested as a signal voltage developed across a burden resistor. The signal voltage is then processed by the trip unit pursuant to initiating a circuit breaker trip function either instantaneously or after a varying time delay, depending upon the severity of the overcurrent condition manifested by the signal voltage amplitude. An important consideration in the design of static trip units is the prevention of spurious or nuisance tripping of the circuit breaker in response to a momentary high level of overcurrent and overcurrents of rapidly decreasing magnitudes. In the latter case, it is extremely important that the trip unit take into account the decreasing nature of the overcurrent condition so as not to operate on the basis of an overcurrent level which no longer exists. It is equally important that the trip unit accurately process a signal voltage of uniform amplitude manifesting a persistent overcurrent condition in order that the appropriate delay interval can be imposed prior to initiating a trip function. All of these factors contribute to accurately defining the trip-no trip boundary of the circuit breaker trip-time curve, as established through adjustment of the trip unit settings.

It is accordingly an object of the present invention to provide a circuit breaker static trip unit including an improved detector circuit for generating a signal current proportional to the peak signal voltage developed across a current transformer burden resistor.

A further object is to provide a peak detector circuit of the above character which is capable of closely following rapid changes in the signal voltage peaks.

An additional object is to provide a peak detector circuit of the above character which is capable of generating an essentially ripple free DC signal current.

Another object is to provide a peak detector circuit of the above character which is efficient in construction and reliable in operation.

Other objects of the invention will in part be obvious and in part appear hereinafter.

SUMMARY OF THE INVENTION

In accordance with the present invention, there is provided an improved detector circuit for generating a DC signal current proportional to the peak amplitude of the signal voltage developed across a current transformer burden resistor. The peak detector circuit of the present invention utilizes a differential amplifier to which the signal voltage is applied. The output of the differential amplifier and one of its inputs are connected with a peak voltage detecting network functioning as a negative DC feedback network pursuant to generating a DC signal current output having a magnitide proportional to the peak signal voltage. Operating in conjunction with the peak voltage detecting circuit is a recovery circuit responsive to the relative amplitudes of consecutive signal voltage peaks. In the event that the signal voltage peaks are decreasing in amplitude, the recovery circuit operates to rapidly adjust the peak voltage detecting circuit in a manner to achieve a corresponding decrease in the magnitude of the signal current output.

The invention accordingly comprises the features of construction, combination of elements, and arrangement of parts which will be exemplified in the construction hereinto set forth, and the scope of the invention will be indicated in the claims.

For a fuller understanding of the nature and object of the present invention, reference should be had to the following detailed description taken in conjunction with the accompanying drawing, wherein:

FIG. 1 is a schematic block diagram of a circuit breaker static trip unit embodying the present invention; and FIG. 2 is a detailed circuit schematic diagram of the improved peak detector circuit of the present invention as utilized in the static trip unit of FIG. 1.

Corresponding reference numerals refer to like parts throughout the several views of the drawing.

DETAILED DESCRIPTION

Figure 1:
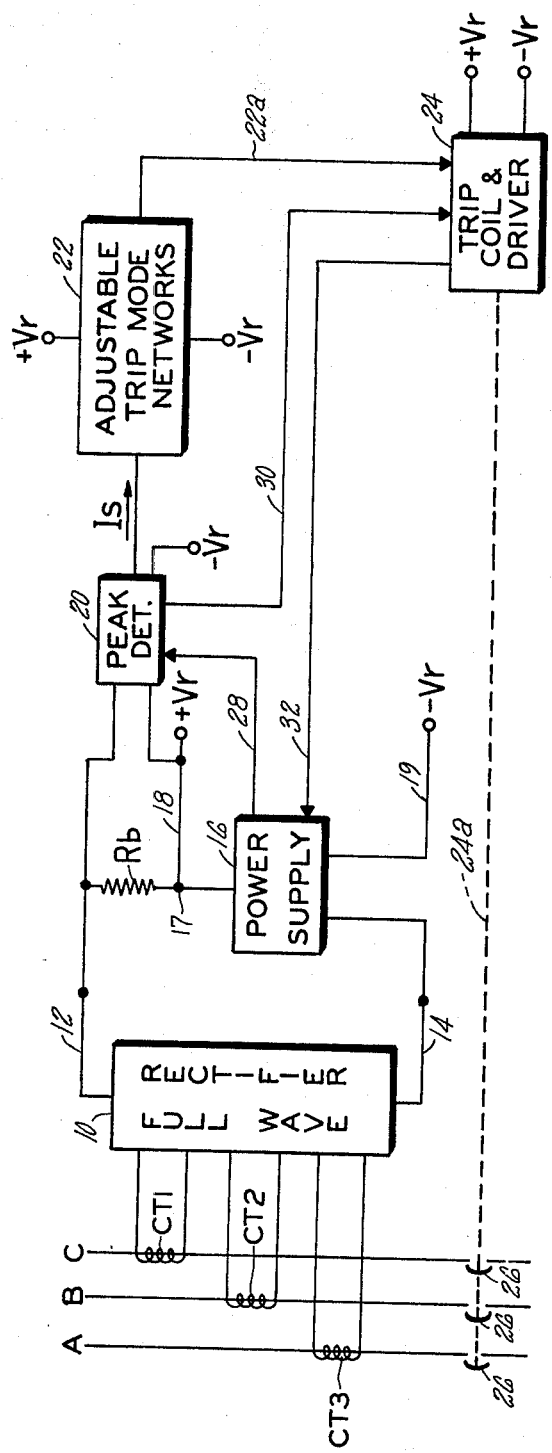

Referring to FIG. 1, a static trip unit is disclosed for incorporation in a circuit breaker pursuant to providing overcurrent protection for a three-wire power distribution circuit consisting of three line or phase conductors A, B and C. The currents in these three phase conductors are individually sensed by current transformers CT1, CT2 and CT3. The multi-turn secondary windings of these current transformers are connected to a full-wave diode rectifying network, generally indicated at 10, whose construction may be that disclosed in applicant's commonly assigned U.S. Pat No. 4,115,829. Positive going full-wave rectified current flows out of rectifying network 10 on positive bus 12 and returns via negative bus 14. The current on bus 12 flows through a burden resistor Rb pursuant to developing a voltage thereacross of a magnitude proportional to the magnitude of the highest of the phase currents flowing in conductors A, B and C.

A power supply 16, preferably of the construction disclosed in my commonly assigned application entitled "Power Supply for Circuit Breaker Trip Unit", Ser. No. 62,388, filed concurrently herewith, is connected between the lower end of burden resistor Rb and bus 14. The power supply functions to develop on a bus 18, connected at its junction 17 with the burden resistor, a regulated supply voltage Vr which is positive relative to the voltage appearing on bus 19. Buses 12 and 18 are also connected as separate inputs to a peak detector 20 so as to respond to the signal voltage developed across burden resistor Rb. Thus, this signal voltage is superimposed on the regulated positive supply voltage Vr appearing on bus 18. As will be seen in connection with FIG. 2, peak detector 20 converts the peak signal voltage to a proportionate current signal Is which is supplied to adjustable trip mode networks 22. These trip mode networks, which typically include a long-time trip mode network, a short-time trip mode network, and an instantaneous trip mode network, are individually operative, depending upon the magnitude of its input current signal to issue a trip signal over lead 22a to a trip coil and driver circuit, generally indicated at 24, and preferably constructed in the manner disclosed in my commonly assigned application entitled "Target Circuit For Circuit Breaker Static Trip Unit", Ser. No. 62,386, filed concurrently herewith. In response to this trip signal, the driver circuit triggers a thyristor pursuant to completing an energization circuit between power supply buses 18 and 19 for a circuit breaker trip coil. Consequent actuation of the trip coil is, as diagrammatically indicated at 24a, coupled with circuit breaker contacts 26 pursuant to tripping them to open circuit positions and thereby interrupt current flow in all three phase conductors of the distribution circuit.

Still referring to FIG. 1, power supply 16 is connected to peak detector 20 via lead 28 over which a disabling signal is supplied to inhibit operation thereof until the regulated power supply voltage Vr developed across buses 18 and 19 arises essentially to its regulated level. The disablement of the peak detector results in the disabling of driver circuit 24 over lead 30. Thus, the spurious operation of these components in response to the presence of signal voltages across the burden resistor RB is avoided during that very short interval while the power supply 16 is raising the supply voltage up to its regulated level. In addition, the trip coil driver circuit 24 supplies a signal over lead 32 back to power supply 16 once a trip function has been irrevocably initiated. This signal is effective in a controlling power supply 16 to collapse the regulated supply voltage across buses 18 and 19, thus preventing overdriving of the trip coil as can readily occur during the interruption of high fault currents flowing in any one of the distribution circuits phase conductors.

Figure 2:
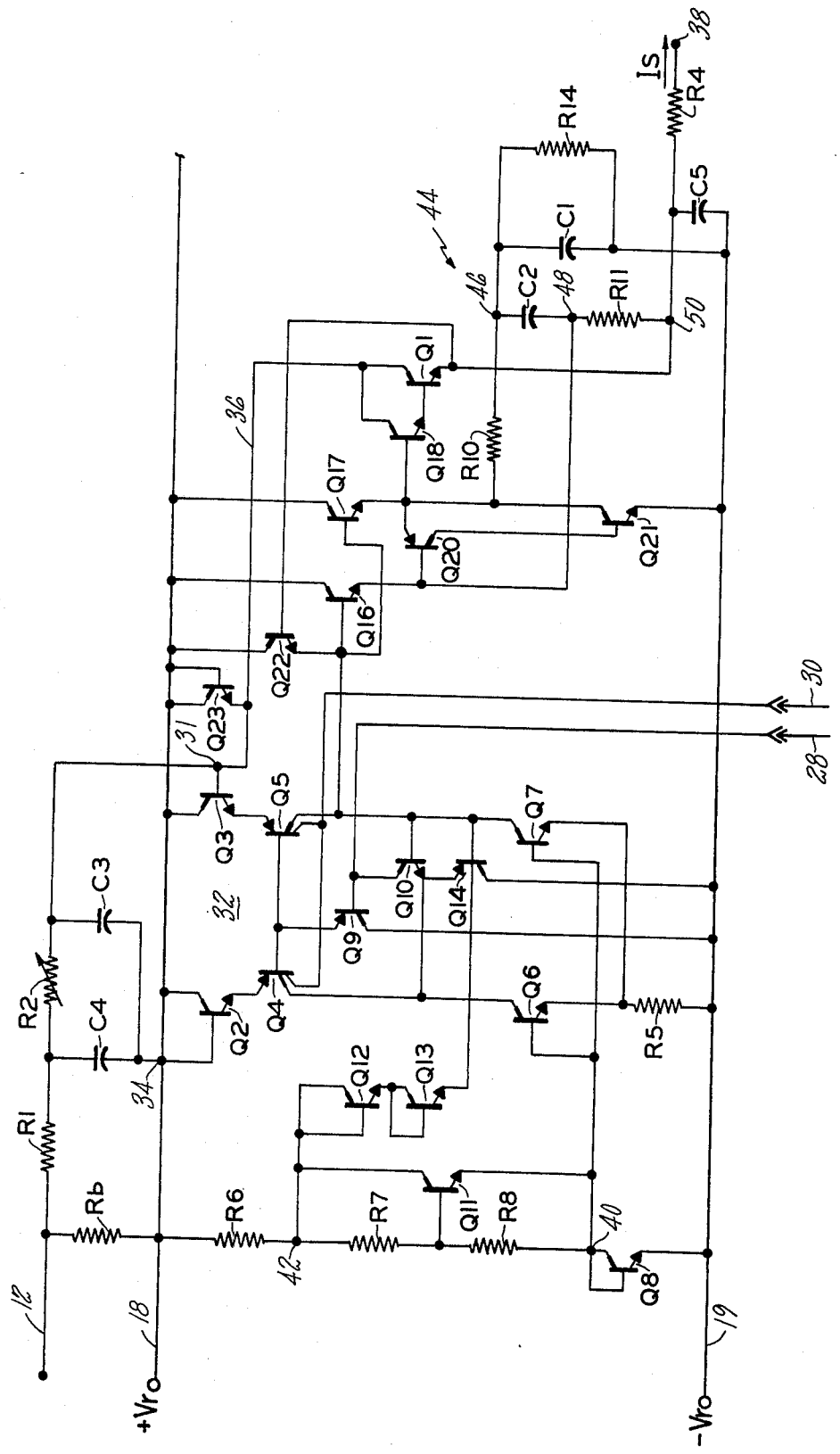

Referring now to FIG. 2, the upper end of burden resistor Rb is connected to peak detector 20 through a resistor R1 and a variable resistor R2 to a terminal 31 constituting the non-verting input of a differential amplifier, generally indicated at 32. Terminal 34, common with bus 18, constitutes the inverting input of the amplifier to which is applied the positive regulated voltage Vr. Amplifier input terminal 31 is also connected via lead 36, the collector-emitter circuit of a transistor Q1, and a resistor R4 to the peak detector output terminal 38 from which flows the current signal Is whose magnitude is proportional to the magnitude of the peak signal voltage developed across burden resistor Rb.

Differential amplifier 32 includes a common collector NPN differential transistor pair, transistors Q2 and Q3, which serve to drive a common base, PNP differential transistor pair, transistors Q4 and Q5. The non-inverting amplifier input terminal 31 is connected to the base of transistor Q3, while the inverting input at terminal 34 is connected to the base of transistor Q2. Their common collectors are connected to bus 18, while the emitter of transistor Q2 is connected to the emitter of transistor Q4 and the emitter of transistor Q3 is connected to the emitter of transistor Q5. One collector of dual collector transistor Q4 is connected to the collector of a transistor Q6 which serves as the current source for the passive leg of amplifier 32. Similarly, one collector of dual collector transistor Q5 is directly connected to the collector of transistor Q7 which serves as a current source for the active leg of the amplifier. The bases of transistors Q6 and Q7 are connected in common to a junction 40 which is held one base-emitter voltage drop up from the negative reference voltage on a bus 19 by a diode-connected transistor Q8. The emitters of transistors Q6 and Q7 are connected in common and through a resistor R5 to the negative bus. The common bases of transistors Q4 and Q5 are connected through the emitter-collector circuit of a transistor Q9 to negative bus 14. An emitter follower transistor Q10 has its base tied to the amplifier active leg, its emitter connected to the amplifier passive leg, and its collector connected to the base of transistor Q9. This emitter follower transistor Q10 forces the voltage on the passive leg of the differential amplifier to track the voltage on the active leg thereof. This has the highly beneficial and unique advantage of virtually eliminating the effect of $h_{oe}$, reduces offset voltage at the amplifier inputs, and increases the output impedance and voltage gain of the amplifier. A second complementary emitter follower transistor Q14 has its emitter connected to the emitter of transistor Q10, its base connected to the base of transistor Q10, and its collector connected to the negative bus 14. Transistor Q14 forces the voltage at the common collectors of transistors Q4 and Q6, and their associated capacitances, to follow abruptly decreasing voltage excursions at the common collectors of transistor Q5 and Q7.

Bias current for the current source transistors Q6 and Q7 is provided by a voltage divider, consisting of resistors R6, R7 and R8, connected between bus 18 and junction 40. Junction 42 between resistors R6 and R7 is connected to junction 40 through the collector-emitter circuit of a transistor Q11, whose base is connected to the junction between resistors R7 and R8. The resistance value of resistor R7 is selected to be twice that of resistor R8 such as to provide, in combination with transistor Q11, a voltage between junction 42 and junction 40 equal to three base-emitter drops. Junction 42 is then connected through two diode-connected transistors Q12 and Q13 to the collector of transistor Q7. This has the effect of preventing the collector of transistor Q7 from falling below two base emitter voltage drops above the negative reference voltage. Consequently, transistor Q7 is prevented from achieving the condition where it deprives emitter follower transistor Q10 of base drive current, which, if permitted to occur, would latch differential amplifier 32 in its off condition.

As will be seen, the differential amplifier operates in conjunction with a peak detecting network, generally indicated at 44 and connected therewith in negative DC feedback fashion, to equalize the voltages at its inputs, terminals 30 and 34, at the peaks of the signal voltage wave created across burden resistor Rb. Under these circumstances, the current signal output Is appearing at output terminal 38 is equal to the peak signal voltage across the burden resistor divided by the resistances of the resistor string, resistors R1 and R2. Resistor R2 is made variable so as to permit selective adjustability in the proportionality of the signal current Is to the peak signal voltage developed across resistor Rb.

The voltage on the collector of transistor Q5, constituting the differential amplifier output, is connected to drive the bases of transistors Q16 and Q17. The latter transistor turns on to develop base drive for transistors Q18 and Q1, connected as a Darlington pair. Transistor Q1 thus turns on to conduct the signal current from amplifier input terminal 31 through resistor R4 to output terminal 38. The voltage at the emitter of transistor Q17, which is one base-emitter drop below the voltage at the collector of differential amplifier transistor Q5, also drives a current through resistor R10 to rapidly charge a capacitor C1. If the output signal current Is is too low, such that the voltage drop in the resistor string R1 and R2 at the peak of the signal voltage across the burden resistor does not bring amplifier input terminal 31 down to equal the reference voltage Vr, terminal 31 will arise above this reference voltage, raising the voltage at the collector of transistor Q5. This raises the voltage on the bases of transistors Q17, Q18 and Q1, causing an increase in the output signal current magnitude requisite to bringing the non-inverting amplifier input terminal voltage down to the reference voltage level. At the same time additional charging current for capacitor C1 is conducted through transistor Q17.

As the signal voltage developed across the burden resistor Rb drops down from its peak, the voltage at non-inverting input terminal 31 falls below the reference voltage level, turning transistors Q3 and Q5 of differential amplifier 32 off. Transistor Q7 pulls the voltage at the collector of transistor Q5 down, and with it the voltage at the base of transistor Q17. This latter transistor turns off, since the voltage at its emitter is retained by capacitor C1 having been charged to a voltage proportional to the previous peak amplitude of the voltage signal developed across the burden resistor. Thus, capacitor C1 serves as a peak detector for this peak signal voltage. It is seen that the voltage on this capacitor produces an emitter voltage on transistor Q1 which is two base-emitter voltage drops down. This emitter voltage, which is sustained during the off-peak intervals of the signal voltage across the burden resistor by the charge on capacitor C1, is effective in producing essentially the same magnitude of signal current Is as flowed during the preceding signal voltage peak.

It is important that the peak detector output current signal remain essentially constant for uniform signal voltage peaks and to respond rapidly to increases in the signal voltage peaks. It is equally important that the peak detector rapidly recover, such that its output current signal accurately follows a decrease in the signal voltage peaks. This characteristic is essential in order to prevent the trip unit from initiating a trip function should an overcurrent condition suddenly cease to exist or abruptly decrease severity. To this end, a fast recovery circuit functioning as a ripple voltage peak detecting network is utilized in conjunction with the low ripple peak detecting network 44. This recovery circuit, comprising a capacitor C2 and associated circuitry, functions in response to a falloff in the signal voltage peak amplitudes, to drain charge from capacitor C1.

Specifically, capacitor C2, having approximately one-tenth the capacitance of capacitor C1, is connected from a junction 46 between resistor R10 and capacitor C1 to a junction 48 common to the emitter of transistor Q16. A resistor R11 is connected from junction 48 to a junction 50 between the emitter of transistor Q1 and resistor R4. At the peaks of the signal voltage across the burden resistor when transistor Q17 is conductive to charge peak detecting capacitor C1, transistor Q16 is also conductive, and it attempts to make the voltage at junction 48 equal to that at junction 46, i.e., one base emitter drop down from the voltage at the collector of transistor Q5 in differential amplifier 32. The voltage at junction 50, during the signal voltage peaks, is three base emitter voltage drops down from the transistor Q5 collector voltage, as imposed by the base-emitter junctions of transistors Q17, Q18 and Q1. During the intersignal peak intervals, this voltage at junction 50 is sustained by the charge on capacitor C1. When transistor Q5 shuts off during the interval between signal voltage peaks and its collector voltage is pulled down by transistor Q7, transistor Q16 goes off to remove its emitter voltage restraint on junction 48. Consequently, the two-emitter voltage drop differential between junctions 46 and 50 is impressed across capacitor C2 and resistor R11. Capacitor C2 begins drawing current from capacitor C1, and the voltage at junction 48 falls exponentially toward the voltage at junction 50. If the next signal voltage peak equals or exceeds the preceding one, both transistors Q16 and Q17 are turned on by the voltage at the collector of transistor Q5 in differential amplifier 32. Transistor Q16 emitter current flows into junction 48 and capacitor C2, and into capacitor C1 to, in conjunction with transistor Q17 emitter current, pump additional charge into capacitor C1. It is thus seen that the voltage on peak detecting capacitor C2 is continuously being reset, to zero, so long as the signal voltage peaks appearing across the burden resistor remain equal or are of increasing amplitude. Manifestly, if the signal voltage peak amplitudes is increasing, the charge on capacitor C1 is increased accordingly, thereby producing a proportionate increase in the magnitude of the output current signal Is.

If the next voltage signal peak does not come up to the amplitude of the preceding one, transistors Q16 and Q17 are not turned on, and thus capacitor C2 is not reset. In fact, the charge on this capacitor continues to change, and the voltage at junction 48 continues falling exponentially toward the voltage at junction 50. When this voltage at junction 48 falls to a level midway between the voltages at junctions 46 and 50, i.e., one base emitter-voltage drop down from the voltage at junction 46, it is seen that transistor Q20, whose emitter is tied to junction 46 via resistor R10 and whose base is directly connected to junction 48, is turned on. The collector current of this transistor provides base drive for a transistor Q21. This transistor then turns on to provide a discharge path for capacitor C1 through its collector-emitter circuit and resistor R10. Charge is thus drained from capacitor C1 to reduce the voltage thereacross down to a level consistent with the new, lower signal voltage peak amplitude appearing across burden resistor Rb. The level of the current signal Is is then adjusted downward accordingly. The current through resistor R11 and capacitor C2 may be established such that, if transistors Q16 and Q17 do not turn on to reset capacitor C2 and replenish the charge on capacitor C1 during any interval of 25 millisecond duration, transistor Q20 is turned on to initiate discharging of capacitor C1. It is thus seen that transistor Q20 responds to the ripple voltage appearing at junction 48, and, if this ripple voltage exceeds the established peak amplitude, transistor Q21 is rendered conductive to drain charge from capacitor C1.

To prevent the downward excursion of the transistor Q5 collector voltage during the intervals between signal voltage peaks from exceeding the reverse emitter-base voltages of transistors Q16 and Q17, a transistor Q22 is included. The base of this transistor is tied to the emitter of transistor Q1, its collector is connected to the positive regulated voltage bus 18 and its emitter is connected to the collector of transistor Q5. It is seen that when the downward excursion of the transistor Q5 collector voltage from the signal voltage peak exceeds four base emitter voltage drops, the base-emitter junction of transistor Q22 becomes forward biased, causing this transistor to turn on and limit further downward excursion of the transistor Q5 collector voltage.

Diode-connected transistor Q23, connected between the regulated positive voltage bus 18 and lead 36, prevents the voltage at amplifier input terminal 30 from falling in excess of one base-emitter voltage drop down from the regulated voltage level Vr. High frequency stability is provided by resistor R10, and a capacitor C3 connected between junction 30 and regulated voltage bus 18, and by a capacitor C5 connected between junction 50 and the negative voltage bus 19. Resistor R1, together with capacitor C4, connected from the junction of resistors R1 and R2 to the regulated voltage bus 18, serve as a high frequency filter to prevent extraneous noise appearing at lead 12 from affecting the detector output signal Is. Resistor R14, connected in parallel with capacitor C1 provides a discharge path for this capacitor in order to establish a ripple on the DC signal current Is, which is a defined small percentage of the current magnitude, at all levels, and which is relatively independent of the current amplification factors of transistors Q18 and Q1.

The junction between the base of transistor Q9 and collector of transistor Q10 is connected with lead 28 coming from power supply 16, as seen in FIG. 1. As disclosed in the above-noted co-pending application entitled "Power Supply For Circuit Breaker Trip Unit", until the supply voltage Vr has come up into substantial regulation, a voltage switch therein impresses a relatively high voltage on lead 28 to back bias the base-emitter junction of transistor Q9, thereby disabling amplifier 32 by depriving transistor pair Q4, Q5 of base current. When the supply voltage achieves substantial regulation, the power supply voltage switch creates an open-circuit condition on lead 28, allowing transistor Q9 to turn on and enable the amplifier. It is thus seen that peak detector 20 is only enabled to respond to a signal voltage across burden resistor Rb when the supply voltage has risen essential to its regulated level Vr.

To also disable the trip coil driver circuit 24 while the supply voltage is out of regulation, the other collectors of differential amplifier dual collector transistors Q4, Q5 are brought out in common for connection with lead 30. While the supply voltage is in regulation, the collector currents supplied on lead 30 constitute a a current source for the trip coil driver circuit 24, rendering it operative. When the supply voltage is out of regulation, the disablement of the peak detector over lead 28 results in a termination of this current source, and the driver circuit is likewise disabled.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In a circuit breaker static trip unit having at least one current transformer for developing a secondary winding current proportional to a distribution circuit phase current flowing in its primary, a rectifier for rectifying the secondary current, a burden resistor and a power supply connected in series across the outputs of the rectifier for developing an undulating DC signal voltage across the burden resistor referenced to a regulated DC supply voltage developed by the power supply; a peak detector comprising, in combination:
   A. a differential amplifier having a first input, a second input connected to one end of the burden resistor at its junction with the power supply to receive the regulated supply voltage, and an output;
   B. a resistor connecting the other end of the burden resistor at its junction with one output of the rectifier to said first input of said amplifier; and
   C. peak detecting means connected as a DC negative feedback network between said output and first input of said amplifier, said peak detecting means including a first capacitor and means responsive to the amplifier output voltage for charging said first capacitor to a voltage proportional to the peak amplitude of said output voltage, said first capacitor voltage producing a DC current signal at a peak detector output terminal which is equal to the signal voltage peak amplitude divided by the resistance of said resistor.

2. The peak detector defined in claim 1, wherein said differential amplifier comprises a common collector NPN transistor differential pair driving a common base PNP transistor differential pair.

3. The peak detector defined in claim 2, wherein said common base PNP transistor differential pair comprises a first transistor having its collector connected in an active leg of said differential amplifier and a second transistor having its collector connected in a passive leg of said differential amplifier, said differential amplifier further including an emitter follower transistor having its base connected to said active leg and its emitter connected to said passive leg, said differential amplifier output being common with said collector of said first transistor.

4. The peak detector defined in claim 1, wherein said differential amplifier generates a maximum output voltage during the peaks of the voltage signal to which said peak detecting means responds by drawing sufficient signal current through said resistor to bring said amplifier input into voltage equality with said non-verting amplifier input during the peaks of the voltage signal appearing across the burden resistor, said first capacitor voltage being stored thereon to sustain the level of signal current drawn through said resistor during the intervals between consecutive signal voltage peaks.

5. The peak detector defined in claim 4, wherein said peak detecting responsive means includes a first transistor having its collector-emitter circuit connected in series between said amplifier first input and said peak detector output terminal to conduct said current signal, a second transistor having its base connected to the output of said amplifier and its emitter jointly connected with said first capacitor and the base of said first transistor, whereby to develop a second transistor emitter voltage for charging said first capacitor and a first transistor emitter voltage for establishing the level of said signal current.

6. The peak detector defined in claim 5, wherein said peak detecting means includes a recovery circuit responsive to the differential amplifier output voltage for automatically effecting a discharge path for said first capacitor when said signal voltage peaks are decreasing in amplitude.

7. The peak detector defined in claim 6, wherein said recovery circuit is in the form of a ripple voltage peak detector including a third transistor having its collector-emitter circuit connected in a discharge path for said first capacitor, a second capacitor, a fourth transistor having its base connected to said differential amplifier output and its emitter connected with said second capacitor to develop a time varying voltage on said said second capacitor during the intervals between signal voltage peaks and to reset the voltage thereon to zero when the amplitude of each signal voltage peak is at least equal to the amplitude of the immediately preceding one, and means responsive to said time varying voltage exceeding an established magnitude for effecting conduction of said third transistor to drain charge from said first capacitor.

8. The peak detector defined in claim 7, wherein the emitter of said second transistor is connected to the base of said first transistor through the base-emitter junction of a fifth transistor, said second capacitor and a second resistor connected in series from the junction of said second transistor emitter and said first capacitor to the first transistor emitter, and the junction of said second capacitor and said second resistor connected to said fourth transistor emitter.

9. The peak detector defined in claim 8, wherein said differential amplifier comprises a common collector NPN transistor differential pair driving a common base PNP transistor differential pair.

10. The peak detector defined in claim 9, wherein said common base PNP transistor differential pair comprises a sixth transistor having its collector connected in the active leg of said differential amplifier and a seventh transistor having its collector connected in the passive leg of said differential amplifier, said differential amplifier further including an emitter follower transistor having its base connected to said active leg and its emitter connected to said passive leg, said differential amplifier output being common with said collector of said sixth transistor.

* * * * *

UNITED STATES PATENT OFFICE
CERTIFICATE OF CORRECTION

PATENT NO. : 4,272,797
DATED : June 9, 1981
INVENTOR(S) : Edward K. Howell

It is certified that error appears in the above-identified patent and that said Letters Patent are hereby corrected as shown below:

Claim 7, line 8, after "said", delete -- said --

Signed and Sealed this

Twenty-fifth Day of August 1981

[SEAL]

Attest:

GERALD J. MOSSINGHOFF

Attesting Officer

Commissioner of Patents and Trademarks